July 7, 1925.
H. W. KRAMER
HANDLE FOR WOODEN BASKETS
Filed Jan. 4, 1924
1,544,654
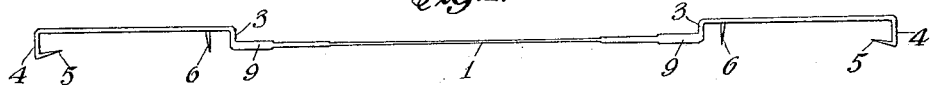
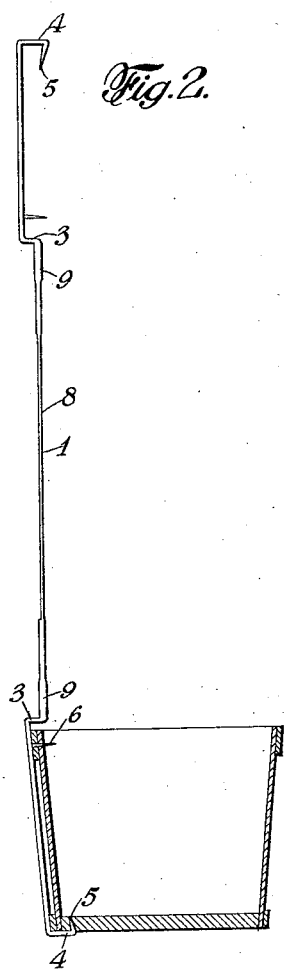
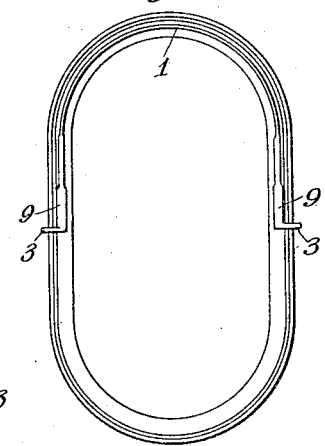
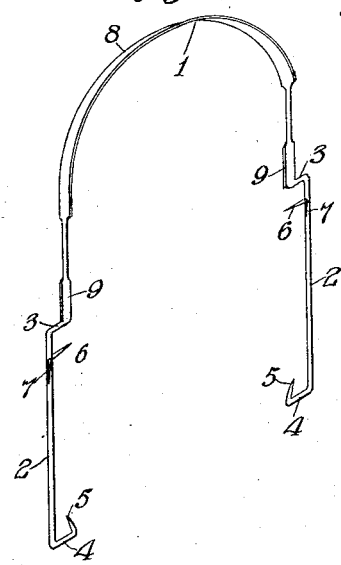
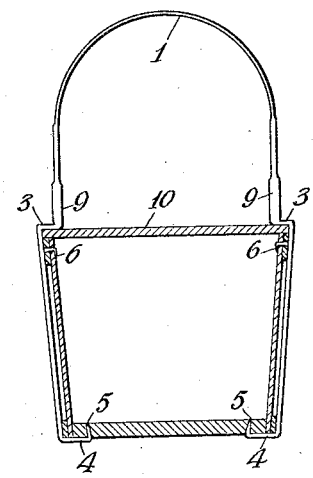
Inventor
Henry W. Kramer
By his Attorney
Louis Prevost Whitaker Patented July 7, 1925.

1,544,654

UNITED STATES PATENT OFFICE.

HENRY W. KRAMER, OF MARLBORO, NEW YORK, ASSIGNOR OF ONE-HALF TO RALPH P. YOUNG, OF MARLBORO, NEW YORK.

HANDLE FOR WOODEN BASKETS.

Application filed January 4, 1924. Serial No. 684,279.

*To all whom it may concern:*

Be it known that I, HENRY W. KRAMER, a citizen of the United States, residing at Marlboro, in the county of Ulster and State of New York, have invented certain new and useful Improvements in Handles for Wooden Baskets; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one form of the same, selected by me for purposes of illustration, and the said invention is fully disclosed in the following description and claims.

The object of my invention is to provide a metallic handle for supporting and carrying a wooden basket of the type ordinarily used for holding and transporting grapes and other fruit, vegetables, etc. As ordinarily constructed, such baskets are usually provided with handles formed of a thin strip of veneer, bent into inverted U-form and secured to the sides of the basket by tacks or staples. These handles are very much in the way in the packing of the baskets and preparing them for shipment, and also in transporting them, and it very frequently occurs that in handling these baskets by the handles during transportation, the handles break or tear away from the basket, throwing the contents to the ground, with consequent loss. The object of my invention is to provide a metal handle formed preferably of wire or rod circular in cross section, and preferably of soft iron, and so constructed that when it is attached to the basket it supports the bottom of the basket and exerts an inward pressure upon the sides so as to strengthen and reinforce the basket itself, being also held from movement lengthwise of the basket, the central portion of the handle being formed into a bale member flattened in one direction in its central portion to provide a smooth hand engaging portion, connected to the side engaging members of the handle by inwardly extending offsets and flattened adjacent to said offsets, perpendicularly to the hand engaging portion, to facilitate bending the bale member into a horizontal position, so that it lies upon or within the edge of the basket entirely out of the way to facilitate filling or packing the basket and the transportation of the same. The offsets are so located with respect to the side walls of the basket that they extend inwardly a sufficient distance above the upper edge of said side walls to serve as retaining devices for the flat cover ordinarily employed with these baskets, but these offsets perform another function in that they carry the lower ends of the bale member to the inner faces of the side walls of the basket and the bail member is made of such length that when folded downward into a horizontal position it will preferably lie within the upper edge of the basket and conform to the shape thereof, so as to facilitate nesting these baskets when empty and being entirely out of the way during the packing of the baskets and the transportation of the same, although of course the handle can be bent upward to the vertical position at any time as desired. The means which I employ for securing the upper portions of the side engaging members to the side of the basket, consist preferably of clinching points integral with the handle and formed by punching out a tongue of metal from the body of the rod, as hereinafter described.

In the accompanying drawing,

Fig. 1 represents a plan view of one form of my improved handle showing the same in condition before it is applied to the basket.

Fig. 2 shows a sectional view of a basket with one end of the handle applied thereto, before bending the bale member.

Fig. 3 is a view similar to Fig. 2 showing the bale member bent and both ends of the handle applied to the basket.

Fig. 4 is a longitudinal sectional view of the basket showing the bale member of the handle bent downwardly into horizontal position.

Fig. 5 is an enlarged perspective view of the handle with the bale member bent into the form which it occupies when the handle is in operative position.

Referring to the drawing, Fig. 1 shows the handle as I prefer to form it before its application to the basket. It is preferably formed out of soft iron wire sufficiently ductile to permit its being bent back and forth several times upon itself without fracturing, and of sufficient diameter to give it the necessary strength and rigidity. The wire or rod is preferably circular in cross section, although it would be possible to use rod or wire of other cross sections, if desired. The central portion of the handle constitutes what I term the bale member, 1, which is made of sufficient length, so that when bent into bale form and after the handle is applied to the basket, and the bale bent into horizontal position, it will substantially follow around the inside of the upper edge of the basket. In other words I prefer to make the handle with special reference to the particular basket to which it is applied so that when the bale is bent downward into horizontal position it is entirely out of the way and will permit the nesting of the baskets after the handles are applied. At each end of the bale member, 1, is a straight side engaging member, 2, connected to the bale member by an offset, 3, the offset being so constructed that when the handle is bent into its operative form, these offsets will extend inwardly over the top edge of the sides of the basket. Each side member, 2, is provided at its lower or outer end with an inwardly extending bottom supporting arm, 4, to engage and support the bottom of the basket, and the outer ends of the arms, 4, are each provided with an angular point, 5, which is bent in a direction toward the bale member. These points preferably extend slightly toward the adjacent side member, 2, so as not to be exactly parallel therewith, and the points, 5, are of considerable length so that they will have a firm bearing in the bottom of the basket which is usually of wood much thicker than the side walls of the basket. These points, 5, are driven upwardly into the bottom of the basket and the inclination of the points has the effect of forcing the side engaging members, 2, inwardly at their upper ends so as to clamp them upon the sides of the basket and reinforce and strengthen the basket. Adjacent to the offset, 3—3, each of the side engaging members is provided preferably with a clinching point, 6, formed intergral with the handle by shearing a tongue of metal out of the rod of which the handle is formed and bending it into the same direction as the offset, 3, and supporting arm, 4, as clearly shown in the drawing, leaving a recess, 7, in each of the side engaging members, 2, where this metal is sheared away. The bale member, 1, has its central portion flattened, as indicated at 8, to form a smooth hand engaging portion, and portions of the handle adjacent to the offsets, 3, are flattened in a transverse direction with respect to the flattened portion, 8, as indicated at 9—9 for the purpose of facilitating the bending of the bale into horizontal position after the handle is attached to the basket. The flattening of the wire or rod at the central portion of the bale also tends to stiffen the bale member.

The handles formed in the manner indicated in Fig. 1, can be readily transported in quantity and are preferably left in this form until actually applied to the baskets, although they may be bent into bale form previous to the application of the basket if preferred. In attaching the handle of the basket, I prefer to follow the plan indicated in the drawing, Figs. 2 and 3. The handle being placed in vertical position as indicated in Fig. 2, with one of the side engaging members, 2, pressed against the lower edge of the side of the basket, the point, 5, is driven upward into the bottom of the basket as far as it will go so as to give a rigid connection therewith. On account of the inclination of the point, 5, the side engaging member, 2, will be pressed inwardly at its upper end against the side of the basket, and the point, 6, will be driven through the side wall and clinched. The handle will then be bent to shape the bale member into bale form and secured on the other side of the basket in the same manner as clearly indicated in Fig. 3. In this position the flattened portions, 9, extend transversely of the basket and the offsets, 3, extend inwardly over the top edge of the side walls, while the points, 6, being clinched, afford a firm support for the upper portion of the side engaging members, 2, and prevent them from moving longitudinally of the basket. The handle can now be bent into horizontal position, as shown in Fig. 4, and will preferably lie within and closely adjacent to the side and end walls at one end of the basket. As these baskets are usually smaller at the bottom than at the top, this permits the baskets to be handled and nested as conveniently as if they did not have the handle. A cover, indicated at 10, may be placed in engagement with the top edges of the basket after it is packed and will be retained in position by the offset portions, 3. In placing the cover in position, the handle may be permitted to remain inside of the basket ready for use whenever desired, if it is considered more convenient to transport the baskets without having the handles in operative position. When the basket and its contents are sold the handle can be raised into operative position by simply moving the cover slightly endwise. If it is desired to have the handles in vertical position during transportation, the bale members can be bent up into vertical position after the baskets are filled and the cover can be placed in position as before described. In such case the handles will have a beneficial effect in steadying a group of these baskets piled one upon another in staggered relation so that the handle of one basket comes between ends of two baskets in the next adjacent upper tier. In some instances I may dispense with the integral clinching points 6, and secure the side engaging members to the sides of the baskets at their upper ends by a staple or other securing device, but I prefer to employ the construction herein shown and described.

It will be noted that as before stated, the engagement of the bottom points, 5, with the bottom of the basket will force the side engaging members against the sides of the basket and the clinching points, 6, assist the points, 5, in holding the handle upon the sides of the basket as well as preventing any movement of the handle longitudinally thereof. It will also be seen that the supporting arms, 4, extending below the bottom of the basket greatly reinforce the structure and prevent the possibility of separation between the side walls and the bottom.

What I claim and desire to secure by Letters Patent is:—

1. A handle for wooden baskets formed of a single piece of ductile metal rod and comprising a centrally located bail member, and a side engaging member at each end of the bail member, connected therewith at their inner ends by angularly disposed offsets, said side engaging members having at their outer ends angular bottom engaging members, extending in the same direction as said offsets, and terminating in angular points extending in a direction toward the bail member, to be driven upwardly into the basket bottom, said points inclining toward the adjacent side engaging members, so as to clamp the latter upon the sides of the basket, when the handle is in operative position.

2. A handle for wooden baskets formed of a single piece of ductile metal rod and comprising a centrally located bail member, and a side engaging member at each end of the bail member, connected therewith at their inner ends by angularly disposed offsets, said side engaging members having at their outer ends angular bottom engaging members, extending in the same direction as said offsets, and terminating in angular points extending in a direction toward the bail member, to be driven upwardly into the basket bottom, said points inclining toward the adjacent side engaging members, so as to clamp the latter upon the sides of the basket, when the handle is in operative position, each of said side engaging members being provided adjacent to its inner end with a clinching point formed by splitting away a portion of the rod, adapted to be forced through the side of the basket and clinched to assist the said angular points in holding the side engaging members in contact with the sides of the basket and prevent movement of the handle lengthwise with respect to the basket.

3. A handle for wooden baskets formed of a single piece of ductile metal rod and comprising a centrally located bail member, and a side engaging member at each end of the bail member, connected therewith at their inner ends by angularly disposed offsets, said side engaging members having at their outer ends angular bottom engaging members, extending in the same direction as said offsets, and terminating in angular points extending in a direction toward the bail member, to be driven upwardly into the basket bottom, said points inclining toward the adjacent side engaging members, so as to clamp the latter upon the sides of the basket, when the handle is in operative position, each of said side engaging members being provided adjacent to its inner end with means for securing it to the side portion of the basket and holding it against movement longitudinally of the basket, the bail member being of such length that when bent into bail form it will conform substantially to the configuration of the portion of the edge of the basket from the plane of attachment of the handle to the end of the basket, and the material of the handle being sufficiently soft to permit the bail member to be bent downward transversely of the side members into substantially the plane of the basket edge to facilitate filling, nesting and transporting the baskets.

4. A handle for wooden baskets formed of a single piece of ductile metal rod and comprising a centrally located bail member, and a side engaging member at each end of the bail member, connected therewith at their inner ends by angularly disposed offsets, said side engaging members having at their outer ends angular bottom engaging members, extending in the same direction as said offsets, and terminating in angular points extending in a direction toward the bail member, to be driven upwardly into the basket bottom, said points inclining toward the adjacent side engaging members, so as to clamp the latter upon the sides of the basket, when the handle is in operative position, each of said side engaging members being provided adjacent to its inner end with means for securing it to the side portion of the basket and holding it against movement longitudinally of the basket, the said handle being provided adjacent to the said offsets, with flattened portions extending transversely of the basket when in operative position to facilitate bending the bail member into and out of a horizontal position with respect to the basket.

5. A handle for wooden baskets formed of a single piece of ductile metal rod and comprising a centrally located bail member, and a side engaging member at each end of the bail member, connected therewith at their inner ends by angularly disposed offsets, said side engaging members having at their outer ends angular bottom engaging members, extending in the same direction as said offsets and terminating in angular points extending in a direction toward the bail member, to be driven upwardly into the basket bottom, said points inclining toward the adjacent side engaging members, so as to clamp the latter upon the sides of the basket, when the handle is in operative position, each of said side engaging members being provided adjacent to its inner end with means for securing it to the side portion of the basket and holding it against movement longitudinally of the basket, the bail member being of such length that when bent into bail form it will conform substantially to the configuration of the portion of the edge of the basket from the plane of attachment of the handle to the end of the basket, and the material of the handle being sufficiently soft to permit the bail member to be bent downward transversely of the side members into substantially the plane of the basket edge to facilitate filling, nesting and transporting the baskets, said handle being provided with flattened portions adjacent to said offsets to facilitate the bending of the bail member into horizontal position, and said bail member having its central portion flattened and disposed perpendicularly to the first mentioned flattened portions, to stiffen the hand engaging portion of the handle and provide a wide bearing portion to engage the hand.

In testimony whereof I affix my signature.

HENRY W. KRAMER.